(12) United States Patent
Suzuki et al.

(10) Patent No.: US 7,317,828 B2
(45) Date of Patent: Jan. 8, 2008

(54) COLOR IMAGE PROCESSING APPARATUS WITH BACKGROUND CONTROL

(75) Inventors: Hiroyuki Suzuki, Toyokawa (JP); Keiji Kusumoto, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 616 days.

(21) Appl. No.: 10/350,054

(22) Filed: Jan. 24, 2003

(65) Prior Publication Data
US 2004/0047504 A1 Mar. 11, 2004

(30) Foreign Application Priority Data
Sep. 9, 2002 (JP) ............................. 2002-263160

(51) Int. Cl.
G06K 9/36 (2006.01)
G06K 9/00 (2006.01)
(52) U.S. Cl. ...................................... 382/167; 382/166
(58) Field of Classification Search ................. 382/166
See application file for complete search history.

(56) References Cited

U.S. PATENT DOCUMENTS

| | | | | |
|---|---|---|---|---|
| 4,658,284 A | * | 4/1987 | Kawamura et al. | 348/458 |
| 5,032,904 A | * | 7/1991 | Murai et al. | 358/500 |
| 5,189,528 A | * | 2/1993 | Takashima et al. | 358/448 |
| 5,359,437 A | * | 10/1994 | Hibi | 358/529 |
| 5,363,174 A | * | 11/1994 | Magde et al. | 399/49 |
| 5,909,505 A | * | 6/1999 | Katayama et al. | 382/164 |
| 5,937,232 A | * | 8/1999 | Taguchi et al. | 399/81 |
| 6,028,957 A | * | 2/2000 | Katori et al. | 382/162 |
| 6,163,334 A | * | 12/2000 | Irie et al. | 347/249 |
| 6,198,845 B1 | * | 3/2001 | Tse et al. | 382/169 |
| 6,305,776 B1 | * | 10/2001 | Ohshima et al. | 347/17 |
| 6,360,024 B1 | * | 3/2002 | Tan et al. | 382/260 |
| 6,389,162 B2 | * | 5/2002 | Maeda | 382/172 |
| 6,618,171 B1 | * | 9/2003 | Tse et al. | 358/446 |
| 6,816,618 B1 | * | 11/2004 | Imaizumi et al. | 382/239 |
| 7,050,650 B2 | * | 5/2006 | Maurer et al. | 382/275 |
| 2002/0060819 A1 | * | 5/2002 | Nara | 358/530 |

FOREIGN PATENT DOCUMENTS

| | | | |
|---|---|---|---|
| JP | 07-307869 | | 11/1995 |
| JP | 8-111778 | | 4/1996 |
| JP | 11-136517 | | 5/1999 |
| JP | 2001016452 A | * | 3/2000 |
| JP | 2001-16452 | | 1/2001 |

OTHER PUBLICATIONS

U.S. Appl. No. 09/558,906, Apparatus, Method, and Computer Program Product for Image Processing; corresponding to Japan Publication No. 2001-16452.

* cited by examiner

*Primary Examiner*—Wenpeng Chen
*Assistant Examiner*—Yuzhen Ge
(74) *Attorney, Agent, or Firm*—Buchanan Ingersoll & Rooney PC (57) ABSTRACT

In an image processing apparatus, a compression processor compresses a color image data, a storage device stores the compressed data, and an expansion processor expands the data read from the storage device. A first background controller controls background of the color image data not yet compressed by the compression processor, while a second background controller controls background of the image data expanded by the expansion processor. A controller activates either the first background controller or the second background controller.

6 Claims, 10 Drawing Sheets

1ST DIFFERENTIAL FILTER (MAIN SCAN)

| 16 | 0 | 0 | 0 | -16 |
|---|---|---|---|---|
| 32 | 32 | 0 | -32 | -32 |
| 32 | 64 | 0 | -64 | -32 |
| 32 | 32 | 0 | -32 | -32 |
| 16 | 0 | 0 | 0 | -16 |

4622

1ST DIFFERENTIAL FILTER (SUB SCAN)

| 16 | 32 | 32 | 32 | 16 |
|---|---|---|---|---|
| 0 | 32 | 64 | 32 | 0 |
| 0 | 0 | 0 | 0 | 0 |
| 0 | -32 | -64 | -32 | 0 |
| -16 | -32 | -32 | -32 | -16 |

4624

2ND DIFFERENTIAL FILTER (X TYPE)

| 1 | 0 | 0 | 0 | 1 |
|---|---|---|---|---|
| 0 | 0 | 0 | 0 | 0 |
| 0 | 0 | -4 | 0 | 0 |
| 0 | 0 | 0 | 0 | 0 |
| 1 | 0 | 0 | 0 | 1 |

4634

2ND DIFFERENTIAL FILTER (+ TYPE)

| 0 | 0 | 1 | 0 | 0 |
|---|---|---|---|---|
| 0 | 0 | 0 | 0 | 0 |
| 1 | 0 | -4 | 0 | 1 |
| 0 | 0 | 0 | 0 | 0 |
| 0 | 0 | 1 | 0 | 0 |

4632

COLOR IMAGE PROCESSING APPARATUS WITH BACKGROUND CONTROL

This application is based on application Ser. No. 2002-263160 filed in Japan, the contents of which are hereby incorporated by reference.

BACKGROUND OF THE INVENTION

1. Field of the Invention

The present invention relates to image processing of a full color image.

2. Description of Prior Art

A copying machine can support electronic sorting and background control. In the electronic sorting, image data of a plurality of pages of a document is stored temporarily in a memory device, and the stored image data is read in a predetermined order for printing to sort the printed papers. Because the storage capacity of the image data is large, the image data is compressed before stored in the memory device, and the compressed image data are expanded before printing. In the background control, the color of background is set to white for a character image.

Both image data compression and background control may be considered for printing. For example, in Japanese Patent laid open Publication 2001-16452, the underground removal is taken into account when nonreversible compression and expansion are performed with a Joint Photographic Expert Group (JPEG) algorithm. In order to remove mosquito noises liable to occur near an edge in an image, the background is removed twice before and after the compression and the expansion, without deteriorating the gradation characteristic of the image data.

However, for a full color image, the electronic sorting is not supported practically because it needs a large storage capacity of a memory device. Because a memory device having such a large storage capacity becomes available recently, it is under review to equip the electronic sorting function in a full color copying machine or the like. When the electronic sorting function is equipped, it is desirable to increase compression ratio of the image data to be stored in a memory device. If the background control function is also equipped, the correlation of the compression ratio of the image data with the background control has to be considered. The background of an image may be controlled in two types. In the automatic background control, the background control level is set according to the image data, while in the automatic control function, a fixed background control level is set manually. If the background control level is fixed, the compression ratio becomes higher. Therefore, in the image processing in a copying machine or the like, it is a problem where the automatic manual background control functions and where the memory device for electronic sorting is positioned.

SUMMARY OF THE INVENTION

An object of the present invention is to compress data of a full color image efficiently in image processing wherein electronic sorting and background control for a full color image are supported.

In an image processing apparatus according to the invention, a compression processor compresses a color image data, a storage device stores the compressed data, and an expansion processor expands the data read from the storage device. A first background controller controls background of the color image data not yet compressed by the compression processor, while a second background controller controls background of the image data expanded by the expansion processor. A controller activates either the first background controller or the second background controller. Thus, the image processing apparatus supports the manual and automatic background controls and the electronic sorting. In the manual background control which would be used frequently, the image data not yet compressed is processed, and so that the data compression can be performed efficiently so that the number of pages of image data to be stored in the memory device is increased. Preferably, in the image processing apparatus, the full color image data is represented in a color system including lightness or brightness data.

An advantage of the present invention is that in the manual background control which would be used frequently, the image data not yet compressed is processed for the manual background control so that the data compression can be performed efficiently.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Referring now to the drawings, wherein like reference characters designate like or corresponding parts throughout the several views, an image processing apparatus such as a multi-functional peripheral according to an embodiment of the invention supports electronic sorting and background control for a full color image. In the electronic sorting, data of a plurality of pages of a document is read and stored in a memory device. Then, on printing, one of various modes of sorting is performed based on the stored data. In the background control, either automatic or manual background controls may be performed. In the automatic background control, the background control level (threshold level) is set according to the image data, while in the manual background control, an operator sets the background control level. In order to increase the processing speed, the automatic background control is performed based on the read image data, without using a prescan. In an example, the background control value is set according to a histogram of lightness (L) of an image obtained based on the color image data.

In the electronic sorting wherein a full color image data is compressed to be stored in a memory device and expanded from the memory device thereafter, the compression ratio depends on whether the background of the image data is fixed or not. If the background control level is fixed, the compression ratio of the image data after the background control becomes higher, and the number of pages (of document image) to be stored in a memory device becomes larger. Because the automatic background control is based on the image data read on a document, it is needed to store the image data once in a memory device and to control the background based on the image data. Therefore, when the image data is stored for the electronic sorting, the background of the image data cannot be controlled. On the contrary, in the manual background control, before the image data is compressed, the background is controlled according to the background control level (fixed value) set by an operator, so that the compression ratio becomes higher. Usually the manual background control would be used by an operator. Then, in this embodiment, the manual background control is set in default, as a preprocessing before the image data is compressed. In the manual background control, the background level of a document image is necessarily a fixed value. Thus, when the manual background control is performed, the ratio of image compression is improved, to increase the number of pages of image data in electronic sorting. On the other hand, in the automatic background control, the background control is performed on the image data after the compression thereof.

Figure 1:
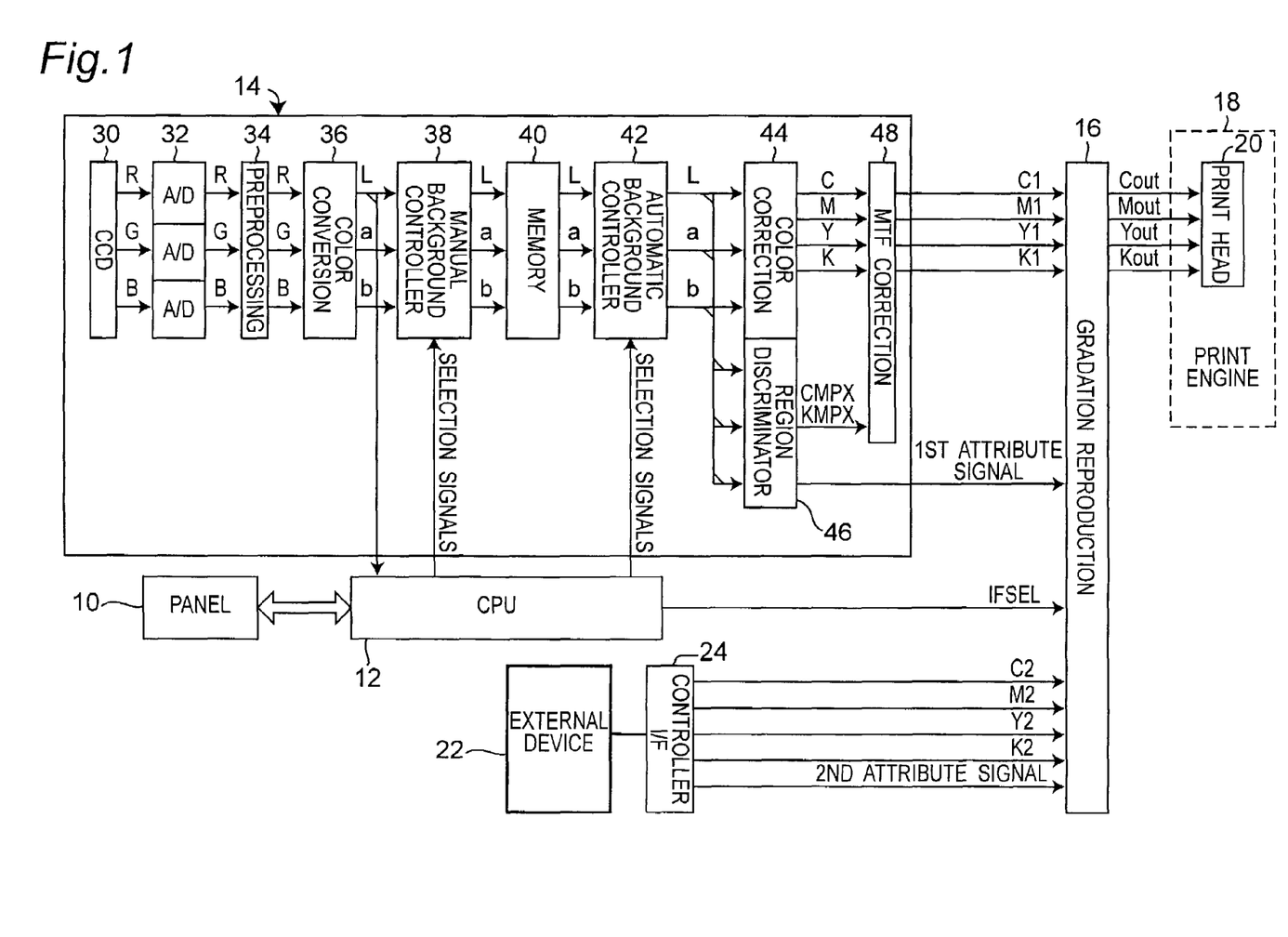
FIG. 1 is a block diagram of an image processing apparatus.

FIG. 1 shows an entire structure of a multi-functional peripheral that can be used as a copying machine, a printer or the like. The multi-functional peripheral supports electronic sorting for a color image. As mentioned above, automatic background control is performed based on image data of a document while the image data is read, without using a prescan. Based on the setting in an operational panel by an operator, a central processing unit (hereinafter referred to CPU) 12 controls the entire multi-functional peripheral. Image data read by an image reader 14 is sent via a gradation reproduction processor 16 to a print head 20 in a print engine 18. On the other hand, an external device 22 such as a print controller sends print data via a controller interface 24 to the gradation reproduction processor 16. The gradation reproduction processor 16 processes gradation reproduction of one of the print data received from the image reader 14 or the external device 22 according to attribute data received also therefrom and sends the processed data to the print head 20.

In the image reader 14, a charged-coupled device (CCD) sensor 30 of red (R), green (G) and blue (B) reads an image of a document, and an analog-to-digital converter 32 converts the detected signals to digital image data of the three colors. In a preprocessor 34, the digital image data R, G and B are subjected to various processings such as shading correction, correction on the read positions of three colors, R, G and B, in the CCD sensor 30, correction of color aberration, the setting of magnifying factor, and position shift of the image. Next, a color converter 36 converts the RGB image data to image data in a color system including lightness component such as Lab or Luv color space. In this embodiment, Lab color space is used. Next, when manual background control is instructed, image data in Lab color space (or Lab image data) is subjected to manual background control performed by the manual background controller 38. Then, the image are compressed and stored in the memory device 40 for the electronic sorting. On the other hand, in the automatic background control explained later, the lightness data (L) before sent to the manual background controller 38 is received by CPU 12, which generates a histogram of L component on the entire document based on the received lightness data in order to determine the background level of the document. Next, CPU 12 sends a signal for selecting the background control coefficient and an automatic/manual selection signal both to the manual and automatic background controllers 38, 42.

On printing, the compressed data in the memory device 40 is expanded to Lab image data. When the electronic sorting is used, the compressed data in the memory device 40 are read and expanded in the order for electronic sorting (for example, the order of page number of the document). When the automatic background sorting control is instructed, the background is controlled on the expanded data by the automatic background controller 42. Next, a color corrector 44 converts the Lab image data to image data for printing of cyan (C), magenta (M), yellow (Y) and black (K). On the other hand, a region discriminator 46 discriminates on the Lab image data in parallel whether it is in a text region or the like. A mutual transfer function (MTF) corrector 48 performs edge emphasis, smoothing or the like according to discrimination on the features of image by the region discriminator 46 and sends the obtained signals $C_1$, $M_1$, $Y_1$ and $K_1$ to the gradation reproduction processor 16. The region discriminator 46 sends a first attribute signal to the gradation reproduction processor 16. The first attribute signal is a signal on character edge region, as will be explained later.

The automatic background controller 42 performs the background control based on the histogram of image data of a document. The histogram is generated while the document is read, without using a prescan. Thus, the automatic background control is performed on the image data held in the memory 40 for electronic sorting after the image data is stored therein.

CPU 12 sends the background control coefficient signal and the automatic/manual selection signal to the manual and automatic background controllers 38 and 42. An operator can select with the panel 10 whether the background control is performed manually or automatically. In the selection, only one of them can be selected because they cannot be set at the same time. That is, if the automatic/manual selection signal is at L level, the automatic background control is performed, while if it is at H level, the manual background control is performed. The background control coefficient signal determines the background control level.

Figure 2:
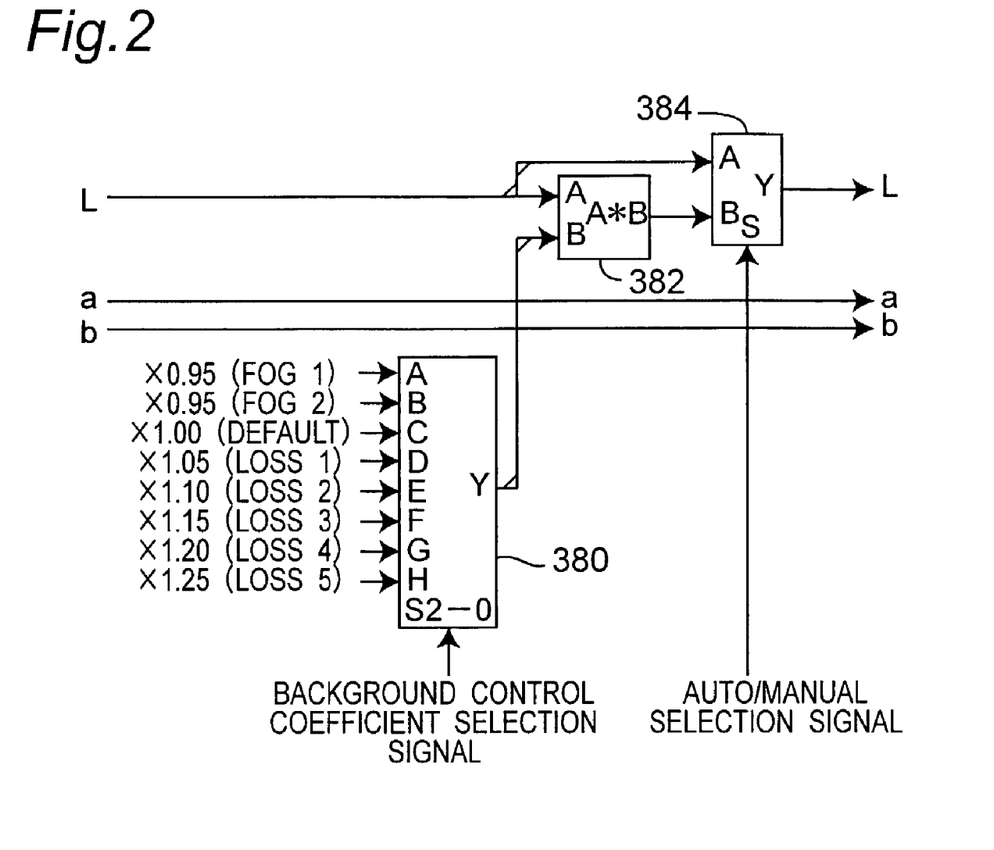
FIG. 2 is a block diagram of a manual background controller.
Figure 3:
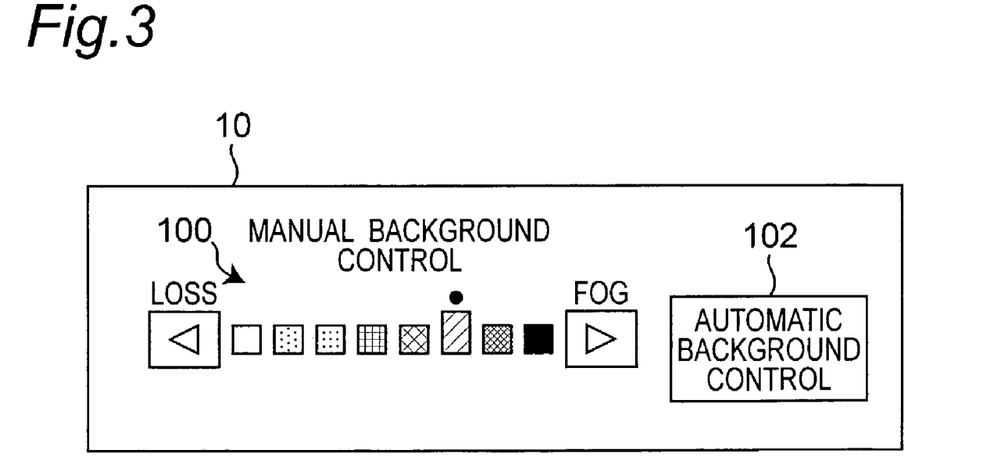
FIG. 3 is a diagram of presentation of a panel for the manual background controller.
Figure 4A:
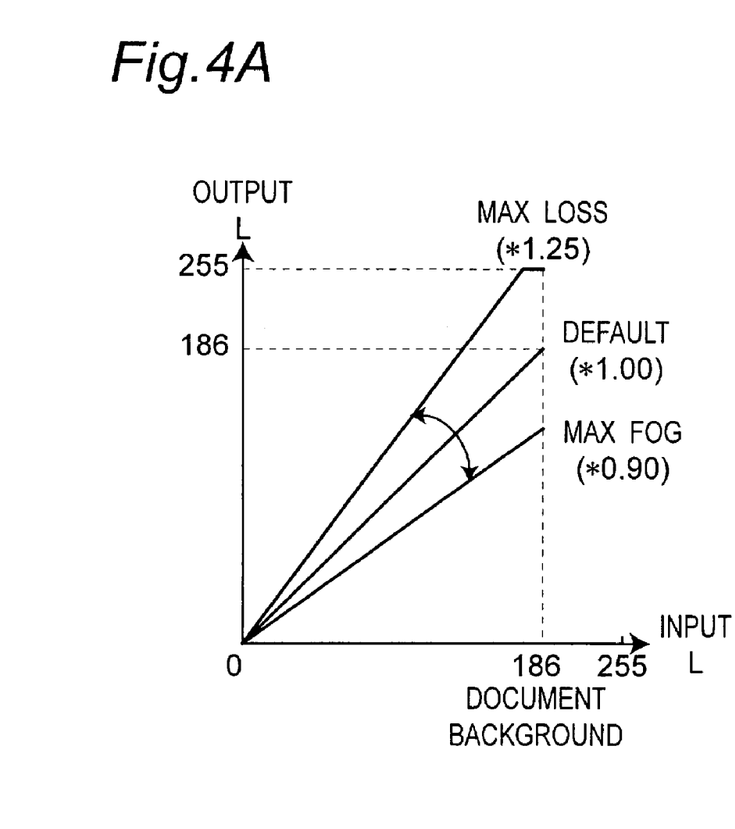
FIG. 4 is a diagram for increasing lightness output in the manual background control.
Figure 4B:
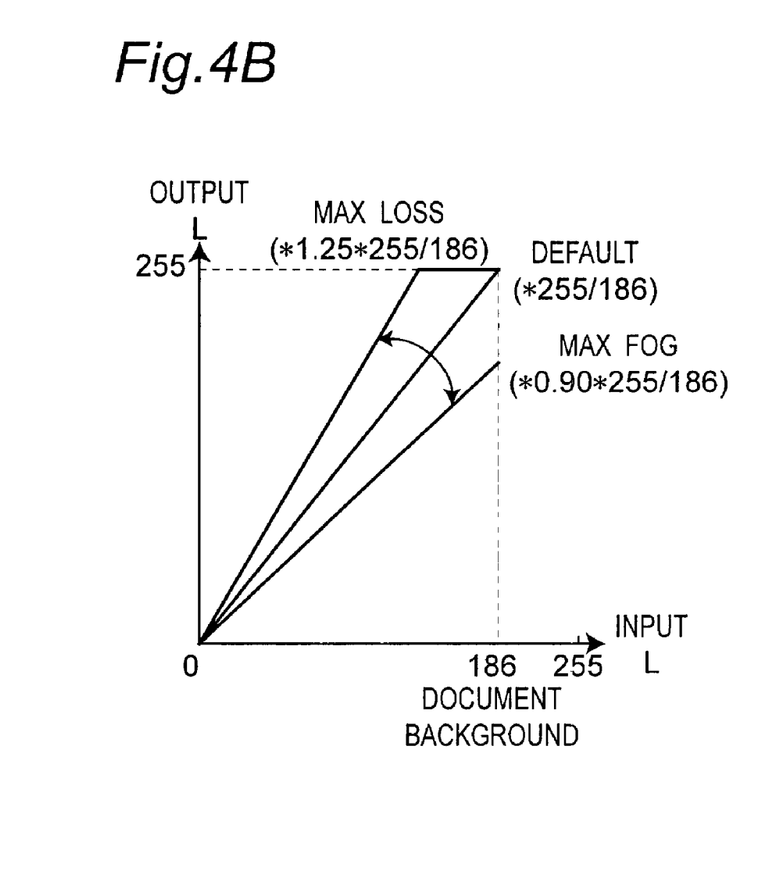

FIG. 2 shows a structure of the manual background controller 38. In the automatic control, the lightness component (L) of the Lab image data obtained by the color converter 36 is multiplied with the background control coefficient instructed with the panel 10. In this example, as shown in FIG. 3, an operator selects one of manual background control levels by pushing an appropriate icon in the presentation 100 in the panel 10. As shown in the presentation 100, the number of background control levels is eight, that is, two in the fog direction, one for default and five in loss direction. A background control level represents a threshold lightness level to removes background or the data having lightness level equal to or smaller than the threshold lightness level. A magnifying coefficient is set for each of them in order to change the data in correspondence to the removal of the background. Then, CPU 12 sends a signal for selecting the magnifying coefficient (background control coefficient) to change the slope of the lightness (L) component shown in FIG. 4A and set the automatic/manual selection signal to H level. The selector 380 selects a magnifying coefficient according to the signal for selecting the background control coefficient. In this example, a magnifying factor between 1.25 to 0.90 is used for the eight control levels, and in the default setting the magnifying factor is 1.00, so that the lightness of the background of the document is not 255. Thus, the selector 384 selects input B. Then, as shown in FIG. 4B, in the default setting, the magnifying coefficient is set a little higher or the slope is set a little steeper, so that the lightness of the background level (186) of the document becomes 255. The magnifying coefficient in the fog direction is set smaller than one while that in the loss direction is set larger than one. The multiplier 382 multiplies the L component with the selected magnifying factor, and the selector 384 outputs the product. At this time, the automatic background controller 42 outputs the as-received data.

Figure 5:
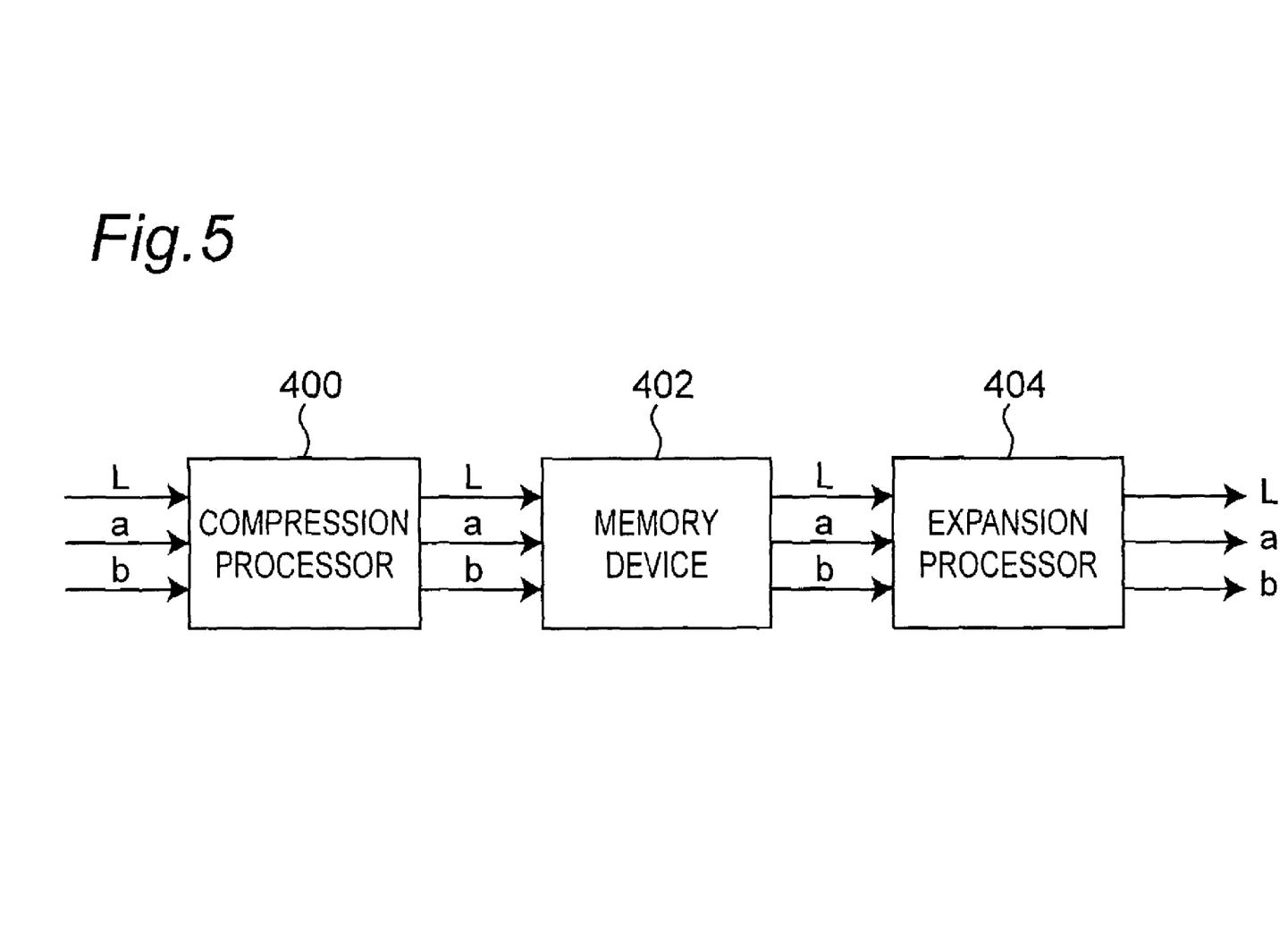
FIG. 5 is a block diagram of a memory device for electronic sorting.

FIG. 5 is a block diagram of a storage device 40 for electronic sorting. In the memory device 40, the Lab image data are compressed by a compression processor 400 and stored in the memory device 422. When the compressed data stored in the memory device 402 are outputted, it is expanded by an expansion processor 404.

Figure 6:
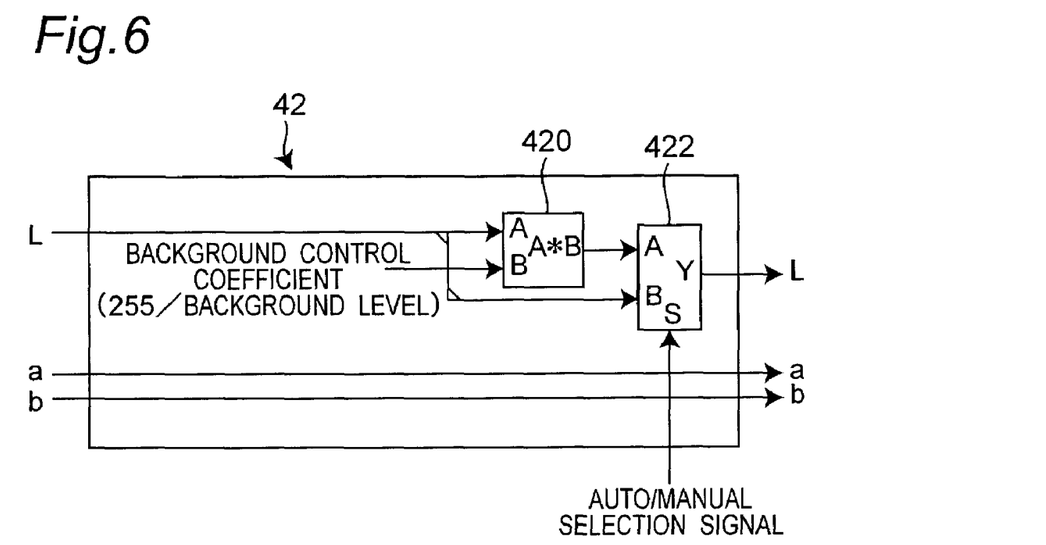
FIG. 6 is a block diagram of an automatic background controller.
Figure 7:
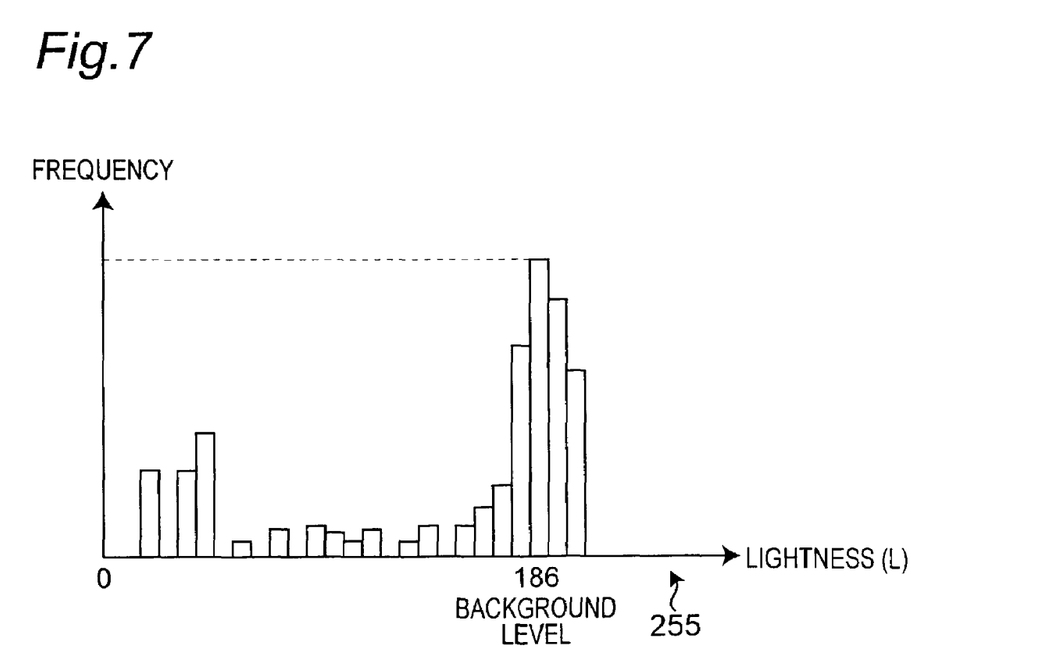
FIG. 7 is a diagram of an example of a histogram of lightness.

FIG. 6 shows a structure of a block diagram of the automatic background controller 42. In the automatic background control, in order to remove the background (to set L to 255) a multiplier 420 multiplies the lightness component L read from the memory device 40 with a background control coefficient obtained based on the background level of the document detected in the histogram of component L on the entire document. FIG. 7 is a diagram of an example of a histogram of lightness. When an operator pressed the automatic background control button in the panel 10, CPU 12 sets the automatic/manual selection signal to L level, and the selector 422 outputs the lightness component multiplied with the background control coefficient. On the other hand, the manual background controller 38 outputs the as-received lightness data.

Figure 8:
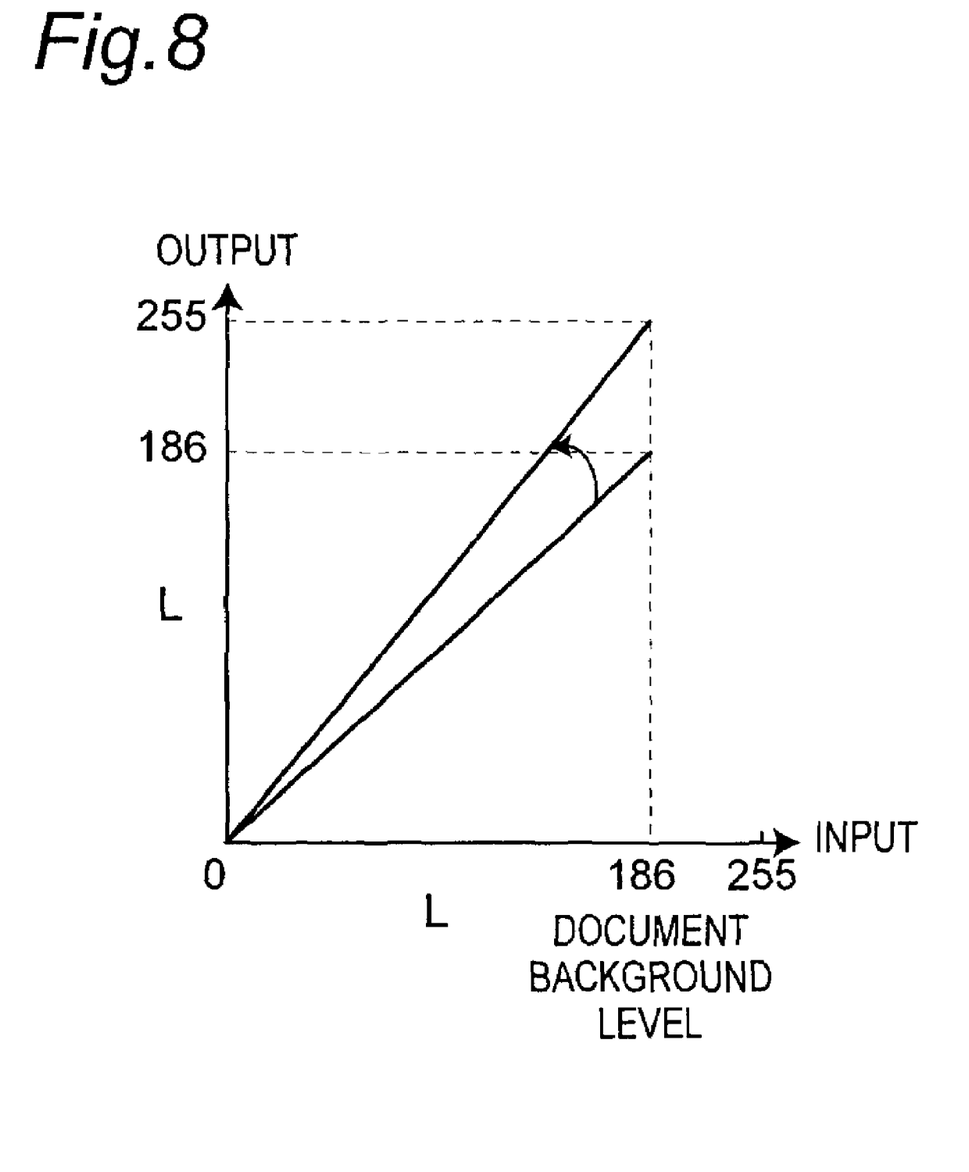
FIG. 8 is a diagram on the control of lightness output in the automatic background control.

A shown in FIG. 8, CPU 12 receives lightness (L) generated by the color converter 36 to generate a lightness histogram on the entire document wherein the abscissa represents lightness (L) and the ordinate represents frequency. Then the background control coefficient is determined as 255/186 in this example so that the lightness value (186) having the largest frequency becomes 255.

Figure 9:
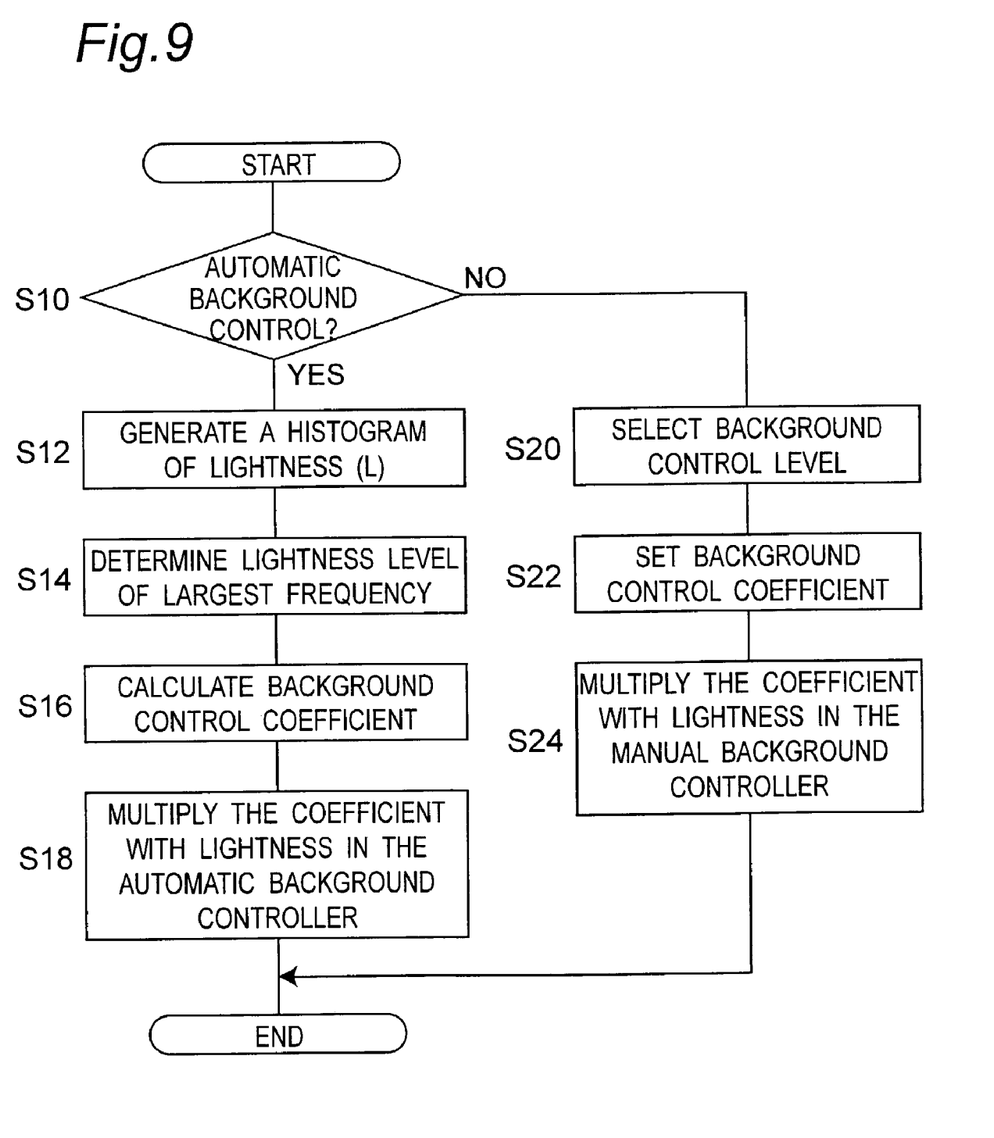
FIG. 9 is a flowchart of background control.

FIG. 9 is a flowchart of background control of the CPU 12. It is decided first on the basis of the setting in the panel 10 whether the automatic or manual background control is set (S10) When the automatic background control is set (YES at S10), a histogram of lightness is generated by reading data of lightness (L) at a previous stage before the manual background controller 38 as shown in FIG. 1 (S12), and the value of lightness having the maximum frequency is determined in the histogram (S14) Next, a background control coefficient is calculated by using the lightness value at the background control level (S16). Then the calculated coefficient is set to the automatic background controller 42, and the automatic/manual selection signal for the automatic background controller 42 is set to L level (automatic control) (S18). Then, in the automatic background controller 42, input A of the selector 384 is selected, and the background control coefficient is multiplied with the lightness. On the other hand, in the manual background controller 38, automatic/manual selection signal is set to L level, and input B of the selector 422 is selected to output the as-received lightness data.

On the other hand, when the automatic background control is not set (NO at S10), that is, when the manual background control is set, the background control level selected in the panel 10 is received (S20), and the background control level is sent to the manual background controller 38 (S22). Thus, the manual background controller 38 sends the background control coefficient. Next, the automatic/manual selection signal of H level (manual control) is sent to the manual background controller 38 (S24). Thus, the background control coefficient is multiplied with the lightness in the manual background controller 38 and the product is selected to be outputted by the selector 384. On the other hand, in the automatic background controller 42, the automatic/manual selection signal is set to H level, and input B of the selector 422 is selected to output the as-received lightness data.

Figure 10:
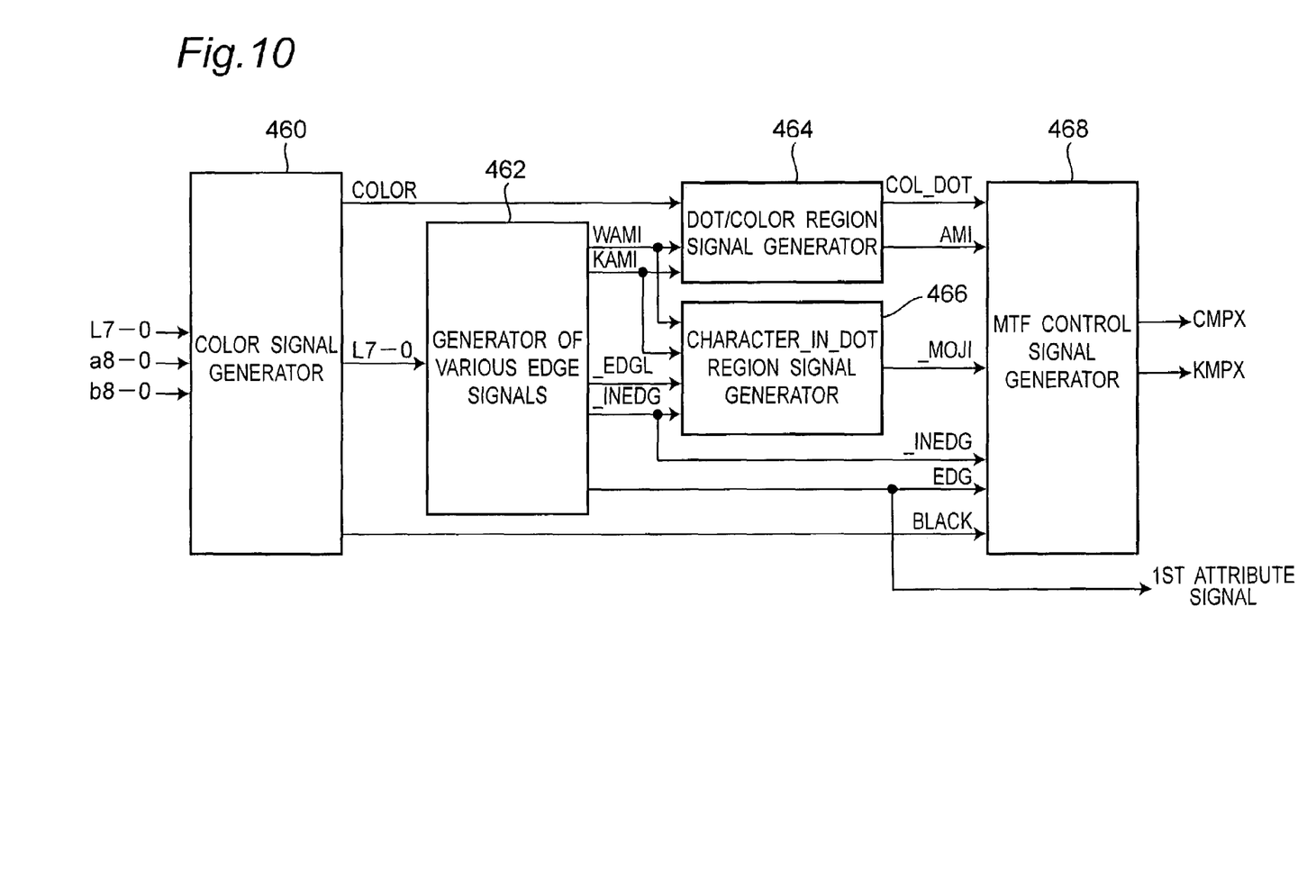
FIG. 10 is a block diagram of a region discriminator.

FIG. 10 shows a structure of the region discriminator 46 which provides various discrimination signals. The details of the region discrimination are not necessary for the explanation of the invention, and only a summary thereof is given below. A color signal generator 460 receives Lab image data generated by the color converter 36 and outputs color signal COLOR for a color region or black signal _BLACK for a black region. (The prefix "_" at the top of a signal name means a negative logic signal.) Next, a generator 462 for generating various edge signals receives the lightness data L to generate isolated dot signals WAMI and KAMI for white and black dots, edge signal _EDGL for discriminating a character area in dots, inner edge signal _INEDG for a character region in dots and edge signal _EDG for a character edge region. The character edge region signal _EDG is supplied as the first attribute signal. The dot/color region signal generator 464 receives the signal COLOR and the isolated dot signals WAMI and KAMI to generate color region signal COL_DOT and dot region signal AMI. Another generator 466 receives the isolated dot signals WAMI and KAMI, the edge signal _EDGL and _INEDG to generate signal MOJI for character region in dots. Further a generator 468 for MTF control signals receives signals COL_DOT, AMI, _MOJI, _INEDG, _EDG and _BLACK to generate 3-bit signals CMPX and KMPX for controlling the MTF corrector 48.

Figure 11:
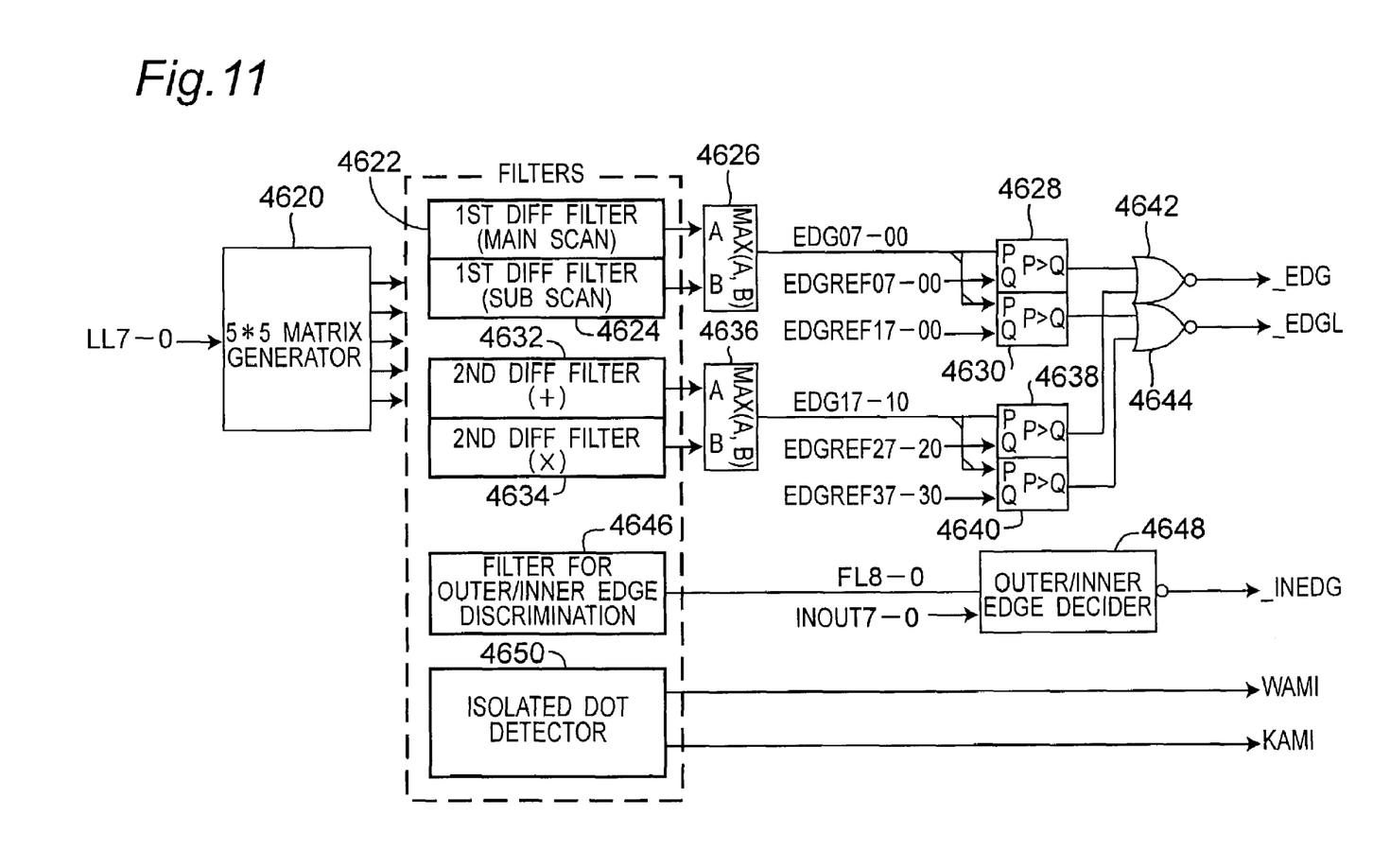
FIG. 11 is a block diagram of a generator of various edge signals.
Figure 12:
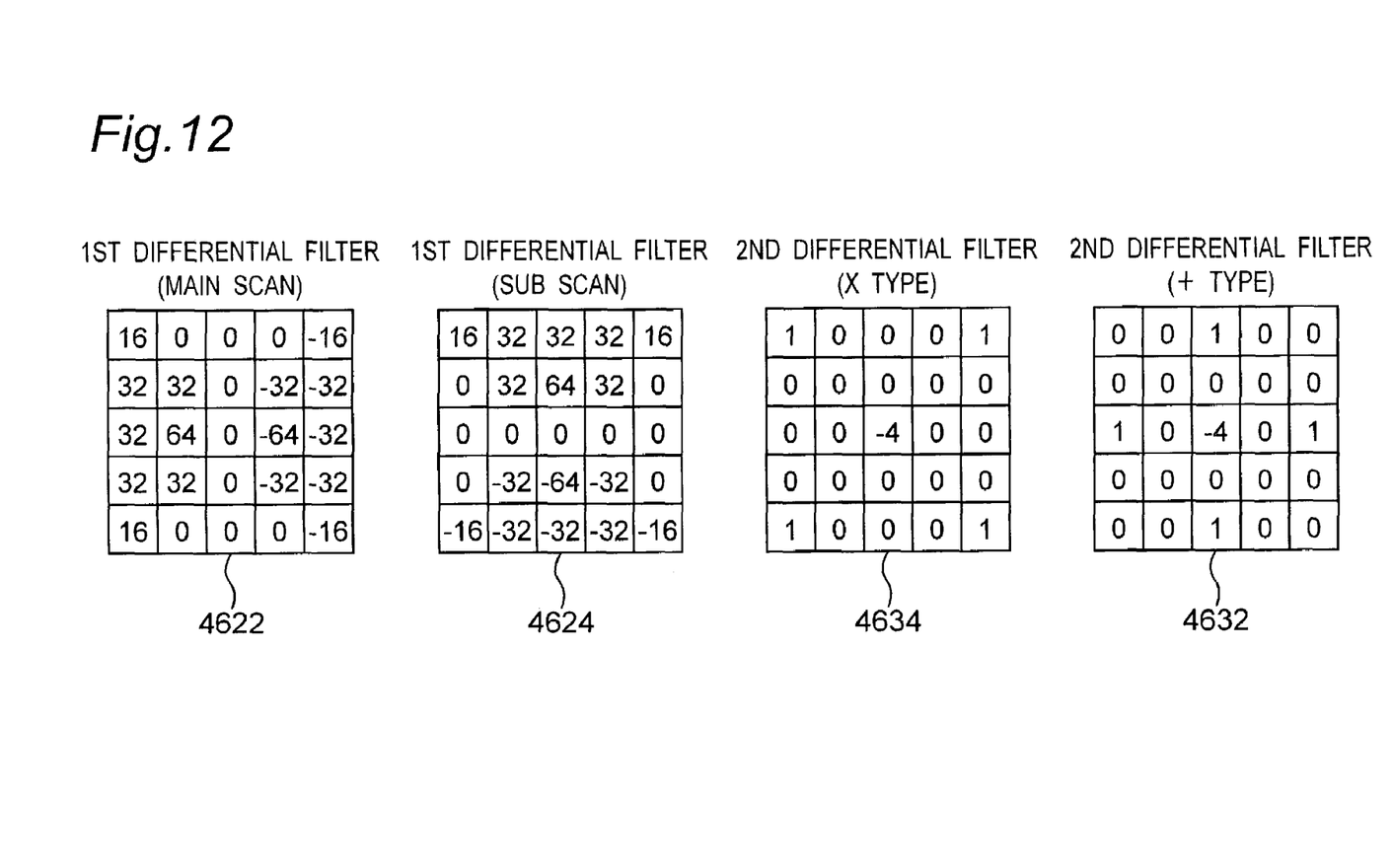
FIG. 12 is a diagram of a filter for extracting features in the generator.

FIG. 11 shows a structure of the generator 462 of various edge signals in the region discriminator 46. First, $L_{7-0}$ data is received by a 5*5 matrix generator 4620 to generate a 5*5 matrix of the $L_{7-0}$ data. The edge signals are generated on the basis of the data in the 5*5 matrix by using various filters for extracting features. A maximum circuit 4626 detects a maximum of the values processed by first differential filters 4622 and 4624, and a comparator 4628 compares the maximum with edge reference $EDGREF_{07-00}$, while a maximum circuit 4636 detects a maximum of the values processed by second differential filters 4632 and 4634, and a comparator 4638 compares the maximum with edge reference $EDGREF_{27-20}$. When one of the output signals of the comparators 4628 and 4638 becomes active, a NOR gate 4642 outputs character edge area signal _EDG active at L level. FIG. 12 shows the first differential filters 4622 and 4624 for in the main scan and subscan directions and second differential filters 4632 and 4634 of cross and x types.

Similarly, a comparator 4630 compares the maximum detected by the maximum circuit 4626 with edge reference $EDGREF_{17-10}$, while a comparator 4640 compares the maximum detected by the maximum circuit 4636 with edge reference EDGREF$_{37-30}$. When one of the output signals of the comparators 4630 and 4640 becomes active, a NOR gate 4644 outputs character_area_in_dots signal _EDGL active at L level.

An output signal FL$_{8-0}$ of a filter 4646 for discriminating an inner or outer edge is compared with reference value INOUT$_{7-0}$ by a decider 4648. For an inner edge in a character, edge_area_in_character signal _INEDG becomes active (L level)

Further the isolated dot detector 4650 generates white and black isolated dot signals WAMI and KAMI for discriminating dots. The signal WAMI (white isolated dot) becomes active at H level when a data V$_{33}$ of a pixel at the center in a 5*5 pixel matrix is larger than those of pixels around the pixel at the center and is larger than an average of data of two pixels in each of eight directions from the center. The signal KAMI (black isolated dot) becomes active at H level when the data V$_{33}$ of a pixel at the center is smaller than those of pixels around the pixel at the center and is smaller than an average of data of two pixels in each of eight directions from the center.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. In the image reader 14, a charged-coupled device (COD) sensor 30 of red (R), green (G) and blue (B) reads an image of a document, and an analog-to-digital converter 32 converts the detected signals to digital image data of the three colors. In a preprocessor 34, the digital image data R, G and B are subjected to various processings such as shading correction, correction on the read positions of three colors, R, G and B, in the COD sensor 30, correction of color aberration, the setting of magnifying factor, and position shift of the image. Next, a color converter 36 converts the RGB image data to image data in a color system including lightness component such as Lab or Luv color space. In this embodiment, Lab color space is used. Next, when manual background control is instructed, image data in Lab color space (or Lab image data) is subjected to manual background control performed by the manual background controller 38. Then, the image are compressed and stored in the memory device 40 for the electronic sorting. On the other hand, in the automatic background control explained later, the lightness data (L) before being sent to the manual background controller 38 is received by CPU 12, which generates a histogram of L component on the entire document based on the received lightness data in order to determine the background level of the document. Next, CPU 12 sends a signal for selecting the background control coefficient and an automatic/manual selection signal both to the manual and automatic background controllers 38, 42.

What is claimed is:

1. An image processing apparatus comprising:
    a compression processor which compresses a color image data;
    a storage device which stores the data compressed by said compression processor;
    an expansion processor which expands the data read from said storage device;
    a first background controller which controls background of the color image data not yet compressed by said compression processor, said first background controller outputs to the compression processor;
    a second background controller which controls background of the image data expanded by said expansion processor;
    a decider which decides which of manual background control mode and automatic background control mode is set, a background control level being set manually in the manual background control mode or automatically based on the image data in the automatic background control mode; and
    a controller which activates said first background controller when said decider decides that the manual background control mode is set and activates said second background controller when said decider decides that the automatic background control mode is set.

2. The image processing apparatus according to claim 1, further comprising a converter which converts input color image data to color image data in a color system including lightness component.

3. The image processing apparatus according to claim 2, wherein said first background controller removes background by multiplying the lightness component data with a coefficient set with an operation panel.

4. The image processing apparatus according to claim 2, further comprising a histogram generator which generates a histogram based on the lightness component data, wherein said second background controller removes background based on the background control level determined according to the generated histogram.

5. The image processing apparatus according to claim 2, wherein the color system including lightness component is a Lab color system.

6. The image processing apparatus according to claim 1, further comprising a color sensor which senses a color image of a document to provide the color image data.

* * * * *

UNITED STATES PATENT AND TRADEMARK OFFICE
CERTIFICATE OF CORRECTION

PATENT NO. : 7,317,828 B2 Page 1 of 1
APPLICATION NO. : 10/350054
DATED : January 8, 2008
INVENTOR(S) : Hiroyuki Suzuki et al.

It is certified that error appears in the above-identified patent and that said Letters Patent is hereby corrected as shown below:

Title Page, Section 56 (References Cited; Other Publications): change "09/558,906" to --09/558,908--.

Signed and Sealed this

First Day of December, 2009

David J. Kappos
*Director of the United States Patent and Trademark Office*